Oct. 12, 1926.   1,602,603
F. R. ANDERSON
COIN CONTROLLED WEIGHING MECHANISM
Filed Dec. 14, 1923   5 Sheets-Sheet 1
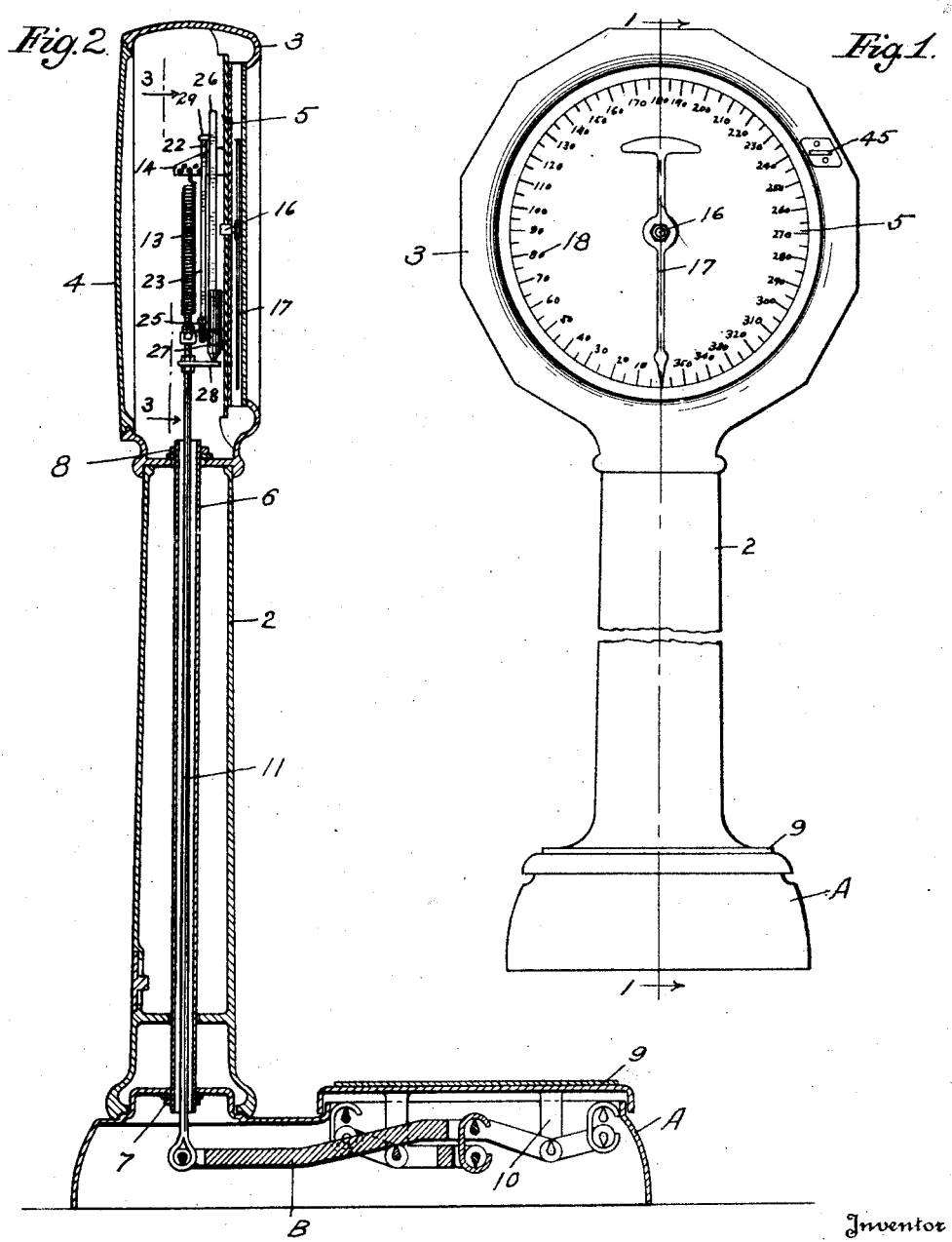
Inventor
FREDERICK R. ANDERSON
By
Attorney

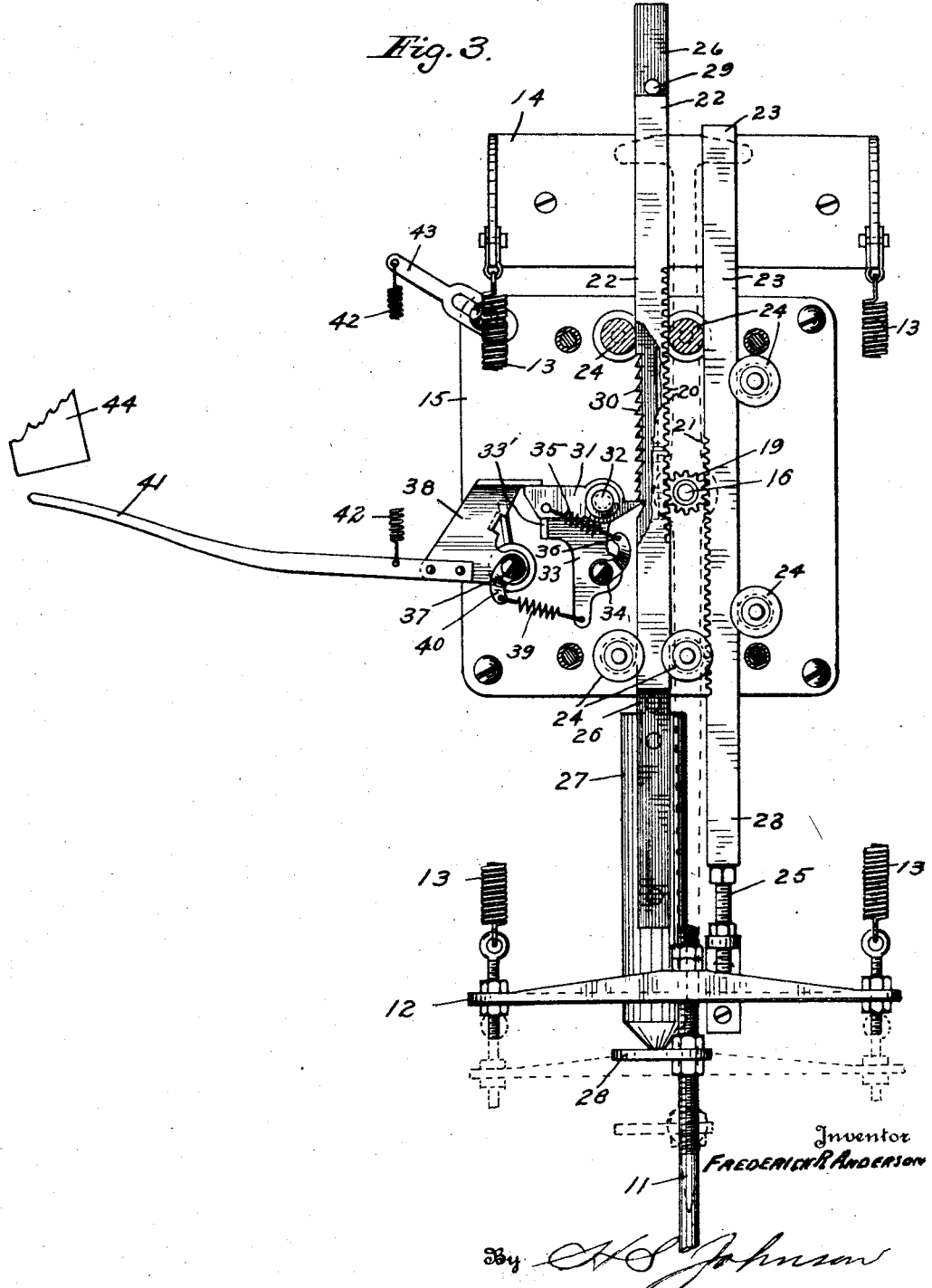

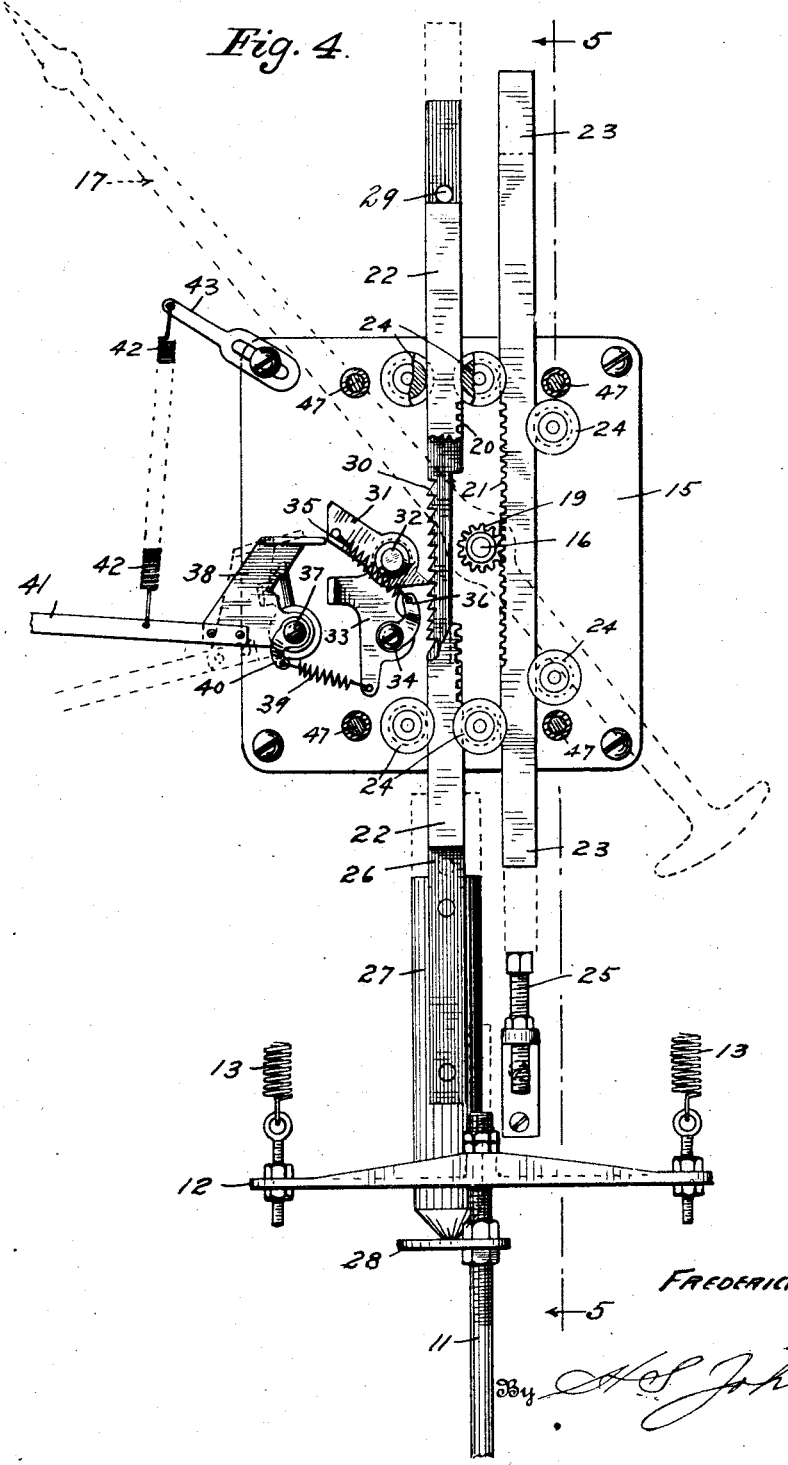

Oct. 12, 1926. 1,602,603
F. R. ANDERSON
COIN CONTROLLED WEIGHING MECHANISM
Filed Dec. 14, 1923    5 Sheets-Sheet 4
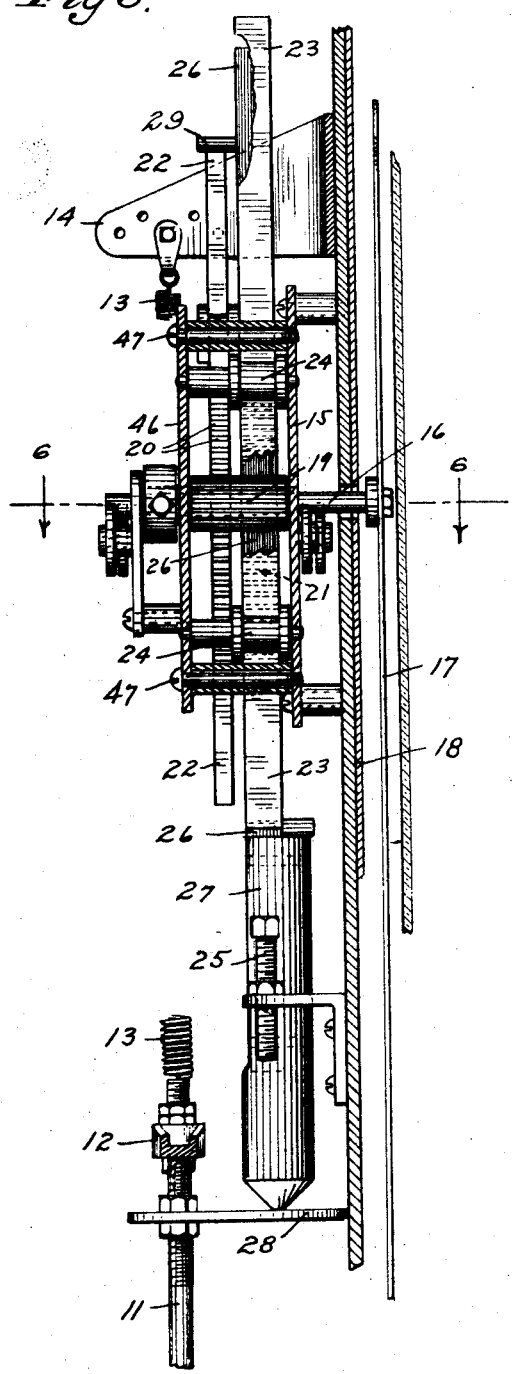
Inventor
FREDERICK R. ANDERSON
By
Attorney Oct. 12, 1926.  
F. R. ANDERSON  
1,602,603  
COIN CONTROLLED WEIGHING MECHANISM  
Filed Dec. 14, 1923  5 Sheets-Sheet 5

Inventor  
FREDERICH R. ANDERSON  
By  
Attorney

Patented Oct. 12, 1926.

1,602,603

UNITED STATES PATENT OFFICE.

FREDERICK R. ANDERSON, OF MINNEAPOLIS, MINNESOTA, ASSIGNOR TO NATIONAL NOVELTY COMPANY, OF MINNEAPOLIS, MINNESOTA, A CORPORATION OF MINNESOTA.

COIN-CONTROLLED WEIGHING MECHANISM.

Application filed December 14, 1923. Serial No. 680,632.

My invention relates to improvements in coin controlled weighing machines and scales, and exists particularly in improvements in the weighing mechanism to insure reliability and efficiency with simplicity of operating parts. The coin controlled features of the present invention are embodied in a separate application, Serial Number 539,950, filed February 28, 1922.

My invention consists in the features of construction and combination hereinafter particularly described and claimed.

In the drawings:—

Figure 1, is a front elevation of a weighing machine embodying my features of invention.

Figure 2, is a vertical section on line 1—1 of Figure 1.

Figure 3, is an enlarged view on line 3—3 of Figure 2, with some parts removed and some parts broken away, and with the operating parts in position holding the indicating arrow at zero.

Figure 4, is a similar view to Figure 3 with the movable parts in weighing position.

Figure 5, is a vertical section, taken on line 5—5 of Figure 4, with some parts shown broken away.

Figure 6, is a cross section on line 6—6 of Figure 5; and

Figure 7:
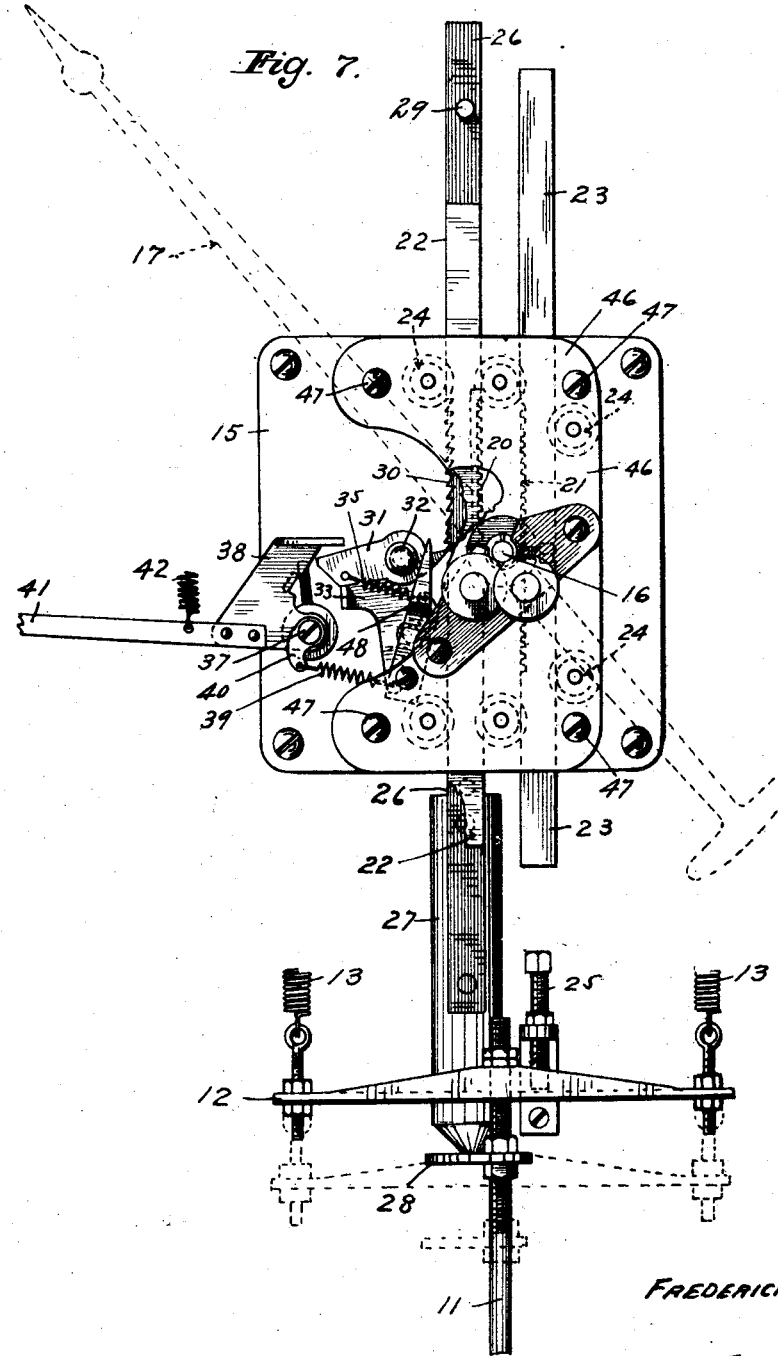
Figure 7, is a similar view to Figures 3 and 4, with the movable parts partly returned to normal position.

Referring to the drawings, A represents a hollow base of usual form, from the rear of which rises the hollow vertical column 2, supporting at its upper end the hollow head 3, the rear of the head being closed by a plate 4, and the front of the head being closed by the ordinary dial 5. The base column and head may be connected together as by a tie-pipe 6, extending centrally through the column and secured to the base and head as by nuts 7 and 8.

Supported upon the base is the usual weighing platform 9, yieldingly upheld through lever mechanism B, supported in connection with lugs 10 depending from the weighing platform. Said lever mechanism at its lower end has bearing support upon a rod 11 passing upwardly through the tie-pipe 6 within the column, the rod 11 at its upper end being connected through the medium of a cross bar 12 with coil springs 13 secured to a bracket 14 supported by the weighing machine head. The leverage construction supporting the weighing platform being of usual type and not being claimed as a part of the present invention, is not specifically set forth and described.

My invention resides in the following described coin controlled mechanism:

Secured at the rear of the dial plate is a plate 15 supporting the operating parts, and centrally journaled in the plate 15 is a shaft 16, supporting at its outer end an indicating hand 17 to cooperate with the dial numbers 18 upon the dial plate. Carried by the inner end of the shaft 16 is a pinion 19, which meshes with teeth 20 and 21 upon the inner edges of the vertically disposed rack bars 22 and 23. The rack bars 22 and 23 are slidably supported between anti-friction rollers 24. The rack bar 23 is longer and heavier than the rack bar 22, so as to act as a counterweight for the bar 22 in restoring the same to normal position, as hereinafter set forth.

An adjustable stop 25 for the rack bar 23 is supported upon the frame work below said bar. Slidably supported behind the rack bar 22, between the anti-friction rollers, is a bar 26, the bar 26 supporting at its lower end a weight 27 adapted, in the operation of the machine, to rest upon a lug 28, adjustably supported upon the tension rod 11. Carried by the bar 26 above the rack bar 22 is a pin 29 adapted to engage with the upper end of the rack bar 22, as hereinafter set forth.

The weighted bar 26 is formed upon its outer edge with ratchet teeth 30 to be engaged by the tooth of the pawl 31 in the operation of the machine. The pawl 31 has fulcrum support 32 upon a cam lever 33, which cam lever has fulcrum support 34 upon the plate 15. The coil spring 35 connects the outer end of the pawl 31 with an upwardly extending finger portion 36 upon the inner side of the cam lever to control the action of the pawl, a rest 33' on lever 33 serving to support the inactive end of the pawl in its normal position.

Having fulcrum support 37 upon the plate 15, adjacent to the cam lever, is a trip 38, adapted to extend over the pawl 31, as shown in Figure 3. The trip has spring connection with the cam lever 33 through the medium of a coil spring 39 connecting the downwardly projecting end of the cam with the downwardly projecting end of a finger 40, carried by the trip. Projecting outwardly from the trip is a trip lever 41, normally held raised by a coil spring 42, connecting the trip lever with a lever arm 43, having adjustable support upon the plate 15. The outer end of the trip lever 41 stands below the outlet end of a coin chute 44, the inlet end 45 of the coin chute being in the face of the machine head. To form a guideway for the rack bars upon the face of the plate 15, I provide a second plate 46 secured upon the face of the plate 15 as by screws 47 and spaced therefrom to form a housing for the interposed parts.

In order to keep the tooth of the pawl 31 from meshing too deeply with the teeth 30 of the rack bar 26, I provide the finger 48, secured behind the plate 46 and projecting upwardly between the fulcrum support of the pawl and the ratchet teeth 30.

The above described mechanism is actuated in the following manner:

In Figure 3, the parts are shown in normal, non-weighing position, with the weighted lever 26 locked in raised position through the medium of the pawl 31. In this position of the parts, if the weight is placed upon the scale platform lowering the tension rod 11, the indicating hand will remain at zero by reason of the fact that the bar 26 remains locked in raised position by the pawl 31, and the engaging trip 38, the bar 22 remaining in raised position through the counter-balancing influence of the heavier bar 23, holding the pinion 19 and the supported indicator immovable. If, however, with the tension rod 11 lowered through the effect of a weight upon the platform, a coin is dropped through the chute 44, the following operation will take place:

As the coin is dropped through the chute 44, it strikes the outer end of the lever 41, and by its weight swings said lever downward on its fulcrum and against the tension of the spring 42 to allow the coin to pass by the lever 41, carrying the trip 38 out of locking engagement with the pawl 31. The releasing of the pawl 31 permits the rack bar 26 to drop, through the influence of the weight 27, into the position shown in Figure 4, with the weight coming to rest upon the stop 28 carried by the tension rod. As the rack bar 26 drops, the pin 29, engaging with the top of the bar 22, carries that bar downwardly, turning the pinion 19 to carry the indicating hand into the dotted line position shown in Figure 4, which registers on the dial the weight of the object upon the scale. This turning of the pinion raises the counter-balance bar 23 into the position shown in Figure 4. As soon as the weight is removed from the weighing platform, the springs 13 will restore the tension rod to the normal position shown in Figure 3, raising the weighted bar 26, the pawl then being forced into locking position with the raised bar 26 and the trip into locking engagement with the pawl through the influence of the controlling springs 35, 39, and 42.

Figure 7 shows the position of the parts just as the bar 26 is reaching this restored position and before the indicator controlling bars 22 and 23 have reached their normal position. The restoring of the parts to the position shown in Figure 3, as will be seen in the drawing, carries the pin 29 out of engagement with the rack bar 22, permitting the pinion 19 to be turned through the weight of the descending bar 23, to raise the bar 22 into the normal position shown in Figure 3.

The subject matter of this application is an improvement on a copending application, the subject matter of which I am the inventor.

I claim:—

1. A weighing mechanism including a resiliently-supported, load-actuated member, a frame plate, a rack bar slidable on the plate and adapted to be actuated by the member, a second rack bar also slidable on the plate and heavier than the first bar, a pinion connecting the two bars, said second bar operating to return the first bar to normal position, and an adjustable stop engaging the lower end of the second bar, for supporting the same in normal position.

2. A weighing mechanism including a resiliently-supported, load-actuated member, a frame plate, a rack bar slidable on the plate and adapted to be actuated by the member, a second rack bar also slidable on the plate and heavier than the first bar, a pinion connecting the two bars, said second bar operating to return the first bar to normal position, a third bar slidable lengthwise of the first bar and having an abutment extending into the path thereof to engage and slide the same away from normal position, said first bar being free to move when not engaged by the abutment, and means urging the third bar into operative relation to said load-actuated member to be actuated thereby.

3. A weighing mechanism including a resiliently-supported, load-actuated member, a frame plate, a rack bar slidable on the plate and adapted to be actuated by the member, a second rack bar also slidable on the plate and heavier than the first bar, a pinion connecting the two bars, said second bar operating to return the first bar to normal position, a third bar slidable lengthwise of the first bar and having an abutment extending into the path thereof to engage and slide the same away from normal position, said first bar being free to move when not engaged by the abutment, a lug carrier by the load-actuated member, and a weight on the lower end of the third bar normally resting on the lug and constituting an operative connection between the load-actuated member and said third bar.

In testimony whereof I affx my signature.

FREDERICK R. ANDERSON.